US009210729B2

(12) United States Patent
Kütt et al.

(10) Patent No.: US 9,210,729 B2
(45) Date of Patent: Dec. 8, 2015

(54) COMMUNICATION SYSTEM AND METHOD

(71) Applicant: SKYPE, Dublin (IE)

(72) Inventors: Andres Kütt, Tallinn (EE); Sergei Anikin, Tallinn (EE); Madis Kaal, Tallinn (EE)

(73) Assignee: Skype, Dublin (IE)

( * ) Notice: Subject to any disclaimer, the term of this patent is extended or adjusted under 35 U.S.C. 154(b) by 53 days.

(21) Appl. No.: 14/077,059

(22) Filed: Nov. 11, 2013

(65) Prior Publication Data
US 2014/0146802 A1 May 29, 2014

Related U.S. Application Data

(63) Continuation of application No. 12/319,372, filed on Jan. 6, 2009, now Pat. No. 8,582,542.

(51) Int. Cl.
*H04W 76/02* (2009.01)
*H04L 12/14* (2006.01)
*H04W 60/02* (2009.01)
*H04W 48/08* (2009.01)
(Continued)

(52) U.S. Cl.
CPC ............. *H04W 76/022* (2013.01); *H04L 12/14* (2013.01); *H04L 12/1439* (2013.01); *H04L 12/1467* (2013.01); *H04W 48/08* (2013.01); *H04W 48/14* (2013.01); *H04W 60/02* (2013.01); *H04L 43/10* (2013.01)

(58) Field of Classification Search
CPC . H04L 12/14; H04L 12/1439; H04L 12/1467; H04L 43/10; H04W 76/022; H04W 60/02; H04W 48/08; H04W 48/14

USPC .................................. 370/328, 338, 351–356
See application file for complete search history.

(56) References Cited

U.S. PATENT DOCUMENTS 5,867,494 A    2/1999   Krishnaswamy et al.
6,332,163 B1   12/2001   Bowman-Amuah
(Continued)

FOREIGN PATENT DOCUMENTS

EP         1770940       4/2007
EP         1502388     12/2007
(Continued)

OTHER PUBLICATIONS

"Extended European Search Report", EP Application No. 13199456. 8, Mar. 12, 2014, 6 pages.
(Continued)

*Primary Examiner* — Jae Y Lee
(74) *Attorney, Agent, or Firm* — Sonia Cooper; Jim Ross; Micky Minhas

(57) ABSTRACT

A method of controlling a connection between a user terminal and an access node connected to a communication network is provided. The user terminal establishes a data connection with the access node, periodically generates a message at predetermined intervals and transmits the periodic message to at least one network node via the access node over the communication network. Responses to the periodic messages are received from the at least one network node. The responses are analyzed to determine whether to terminate the connection to the access node, and in the case that the connection to the access node should be terminated, a disconnect message is transmitted to the access node from the user terminal.

20 Claims, 6 Drawing Sheets

(51) Int. Cl.
*H04W 48/14* (2009.01)
*H04L 12/26* (2006.01)

(56) References Cited

U.S. PATENT DOCUMENTS

| | | | |
|---|---|---|---|
| 6,741,687 B1 | 5/2004 | Coppage | |
| 6,947,379 B1 | 9/2005 | Gleichauf | |
| 7,574,202 B1 | 8/2009 | Tsao et al. | |
| 8,091,116 B2 | 1/2012 | Kutt et al. | |
| 8,582,542 B2 | 11/2013 | Kutt et al. | |
| 2003/0084292 A1* | 5/2003 | Pierce et al. | 713/168 |
| 2003/0212809 A1 | 11/2003 | Wu et al. | |
| 2003/0214928 A1 | 11/2003 | Chuah | |
| 2004/0010545 A1 | 1/2004 | Pandya | |
| 2004/0119814 A1 | 6/2004 | Clisham et al. | |
| 2005/0113070 A1 | 5/2005 | Okabe | |
| 2005/0177515 A1 | 8/2005 | Kalavade et al. | |
| 2006/0052085 A1 | 3/2006 | Rodriguez et al. | |
| 2008/0101335 A1 | 5/2008 | Badger | |
| 2008/0176533 A1* | 7/2008 | Leleu | 455/411 |
| 2009/0055900 A1* | 2/2009 | Gopalasetty et al. | 726/4 |
| 2010/0098055 A1 | 4/2010 | Kutt et al. | |
| 2010/0100951 A1 | 4/2010 | Kutt et al. | |
| 2010/0128667 A1* | 5/2010 | Russell | 370/328 |
| 2010/0275007 A1 | 10/2010 | Kutt et al. | |
| 2011/0085565 A1 | 4/2011 | Yang | |
| 2013/0159711 A1 | 6/2013 | Kaal | |

FOREIGN PATENT DOCUMENTS

| | | |
|---|---|---|
| GB | 2393073 | 3/2004 |
| GB | 246553 | 4/2010 |
| WO | WO-03096165 | 11/2003 |
| WO | WO-03096554 | 11/2003 |
| WO | WO-2005004406 | 1/2005 |
| WO | WO-2005009019 | 1/2005 |
| WO | WO-2007082552 | 7/2007 |
| WO | WO-2008007039 | 1/2008 |
| WO | WO-2008030525 | 3/2008 |
| WO | WO-2009123074 | 10/2009 |

OTHER PUBLICATIONS

"Final Office Action", U.S. Appl. No. 13/363,023, Jun. 5, 2014, 26 pages.

"Authentication protocols based on EAP-AKA for interworking among 3GPP, WiMax, and WLAN in NGN", ITU-T Standard, International Telecommunication Union, Geneva: Q3202.1, May 2008, 24 pages.

"Examination Report", EP Application No. 09783956.7, Jul. 4, 2012, 5 pages.

"Examination Report", GB Application No. 0819388.0, May 28, 2012, 3 pages.

"Final Office Action", U.S. Appl. No. 12/319,372, Nov. 15, 2012, 22 pages.

"International Search Report and Written Opinion", Application No. PCT/EP2009/063283, Jan. 19, 2010, 11 pages.

"International Search Report and Written Opinion", Application No. PCT/US2012/069966, Apr. 8, 2013, 13 pages.

"International Search Report and Written Opinion", Application No. PCT/EP2009/063280, Dec. 30, 2009, 16 pages.

"Non-Final Office Action", U.S. Appl. No. 12/319,367, Jul. 20, 2011, 7 pages.

"Non-Final Office Action", U.S. Appl. No. 12/319,372, Jun. 19, 2012, 21 pages.

"Non-Final Office Action", U.S. Appl. No. 13/363,023, Jan. 6, 2014, 26 pages.

"Notice of Allowance", U.S. Appl. No. 12/319,367, Nov. 10, 2011, 5 pages.

"Notice of Allowance", U.S. Appl. No. 12/319,372, Jul. 9, 2013, 16 pages.

"Search Report", GB Application No. 0819387.2, Jan. 25, 2010, 2 pages.

"Search Report", GB Application No. 0819388.0, Jan. 27, 2010, 2 pages.

Nussbaum,"Prototype de canal cache dans le DNS", Colloque Francophone sur L'Ingenierie des Protocoles CFIP; Retrieved from: http://www.loria.fr{Inussbau/files/cfip-tuns-article.pdf>, Mar. 3, 2008, 5 pages.

* cited by examiner

COMMUNICATION SYSTEM AND METHOD

RELATED APPLICATION

This application is a continuation of, and claims priority to U.S. patent application Ser. No. 12/319,372, which in turn Ser. No. 12/319,372 claims priority under 35 U.S.C. §119 or 365 to Great Britain Application No. 0819388.0, filed Oct. 22, 2008. The entire disclosures of the above applications are incorporated herein by reference.

TECHNICAL FIELD

This invention relates to a communication system and method.

BACKGROUND

Packet-based communication systems allow the user of a device, such as a personal computer, to communicate across a computer network such as the Internet. Packet-based communication systems include voice over internet protocol ("VoIP") communication systems. These systems are beneficial to the user as they are often of significantly lower cost than fixed line or mobile networks. This may particularly be the case for long-distance communication. To use a VoIP system, the user must install and execute client software on their device. The client software provides the VoIP connections as well as other functions such as registration and authentication. In addition to voice communication, the client may also provide further features such as video calling, instant messaging ("IM"), SMS messaging, and voicemail.

One type of packet-based communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

A problem with packet-based communication systems is that a reliable connection to the internet with a sufficient bandwidth is required. Whilst this is generally not a problem when the user is at a known, fixed location (such as their home), this can be particularly problematic when the user is travelling. Wireless internet hotspots, provided by wireless local area network ("WLAN") access points and appropriate hotspot software, are widely available for use by users when travelling. These are often available in public areas such as airports, cafes and stations. However, these hotspots are frequently not open and access is restricted and secured. These hotspots require the user to obtain login credentials from the hotspot operator in return for payment.

A protocol such as the Wireless Internet Service Provider roaming ("WISPr") protocol can be used for accessing the hotspot. When the WISPr protocol is used, a user attempting to connect to the internet using a restricted-access hotspot is redirected to a login server of the operator of the hotspot. This redirection results in the display of a login page to the user. The login page prompts the user to either enter a username and password (for example if this has been purchased in advance by the user or provided as part of a pre-arranged billing arrangement) or enter credit card (or other payment) details. By entering the required information the user gains access to the hotspot and can connect to the internet, and is charged accordingly.

Accessing hotspots in such a manner is problematic. Firstly, there is a security issue with the user entering payment details into the login server of the hotspot. The user must have sufficient trust in the hotspot provider not to expose their payment details or personal data. Secondly, it is inconvenient for the users to enter payment details into the hotspot login server, as it requires them to have their payment details to hand. Thirdly, it is a slow process to manually log in and enter this information, which is inefficient if the user wishes to quickly access the internet to use the packet-based communication system.

There is therefore a need for a technique to address the aforementioned problems with accessing restricted WLAN hotspots.

SUMMARY

The inventors have appreciated that many of the above-mentioned problems can be addressed by enabling the users to pay for access to a hotspot using credit that the users have already purchased for use in the packet-based communication system. As the users already use the packet-based communication system, they frequently already have a payment relationship with the provider of the packet-based communication software. Typically, this is in the form of pre-paid credits that the user has purchased, for example for making calls between the internet and the public switched telephone network ("PSTN").

The users have trust in the provider of packet-based communication software, as they have a pre-existing billing arrangement. Therefore, the users are more comfortable providing personal data or login credentials to the provider of packet-based communication software, rather than the operator of a hotspot.

Furthermore, the users do not need to enter payment details whenever they want to access a hotspot. Instead, they only need to provide their login credentials for the packet-based communication network due to the pre-existing billing relationship. The mechanism for accessing the hotspot can be closely integrated into the communication client software, which can greatly speed up the process of the user gaining access to the packet-based communication system via the hotspot.

However, there are several problems with enabling the user to pay for access to a hotspot using credits purchased for use in the packet-based communication system.

Firstly, there are security issues as the hotspot is not under the control of the provider of packet-based communication software, but is instead operated by a third party. Therefore, it is not appropriate for the third party hotspot operator to be exposed to the login credentials of the user in the packet-based communication network.

Secondly, there are problems with initially authenticating the user with the packet-based communication network when the only hotspot available is a restricted hotspot. As the access to the hotspot is restricted, the user is unable to gain access to the internet before being authenticated. However, the user needs to be authenticated by the provider of the packet-based communication software (and not the hotspot provider). Therefore, the user must access the authentication systems of the provider of the packet-based communication software, which is difficult without accessing the internet via the hotspot and without being provided with a username and password for use with the hotspot in advance (which would be complex and costly to manage).

Thirdly, once the user is connected to the hotspot it is difficult for the connection to be terminated from the network side. This is because the hotspot is not under the control of the packet-based communication software provider. A network-side termination can be required in the case that the user runs out of credit.

Further issues also exist with ensuring that the accounting for a session using the hotspot is correct and that appropriate payments are made between the user, the packet-based communication software provider and the hotspot operator. Furthermore, the technique for connecting via the hotspot must not be inefficient in terms of signalling or speed.

According to one aspect of the present invention there is provided a method of controlling a connection between a user terminal and an access node connected to a communication network, comprising: the user terminal establishing a data connection with the access node; the user terminal periodically generating a message at predetermined intervals and transmitting the periodic message to at least one network node via the access node over the communication network; receiving responses to the periodic messages from the at least one network node; analysing the responses to determine whether to terminate the connection to the access node; and in the case that the connection to the access node should be terminated, transmitting a disconnect message to the access node from the user terminal.

The step of analysing the responses may comprise determining that at least one of the responses comprises a command to terminate the connection from the at least one network node.

The step of analysing the responses may comprise determining that at least one of the responses has not been received at the user terminal within a predefined time interval.

The periodic message may comprise a sequence number, and the sequence number is incremented for each periodic message generated.

The step of transmitting the periodic message to the at least one network node may comprise alternately transmitting the periodic message to a first network node and a second network node.

Preferably, the method further comprises the step of the at least one network node storing each periodic message in a database.

Preferably, the periodic message is a tick message.

Preferably, the connection to the access node is terminated responsive to the at least one network node determining that a user of the user terminal has less than a predetermined quantity of credit.

In one embodiment, the user terminal is executing a communication client, and the communication client is arranged to perform the steps of the method. Preferably, the communication client is a voice over internet protocol client.

According to another aspect of the invention there is provided a computer program product comprising program code means which, when executed by a computer implement the steps according to the above method.

According to another aspect of the invention there is provided a communication system comprising: a communication network; an access node connected to the communication network; at least one network node connected to the communication network; and a user terminal configured to establish a data connection with the access node, wherein the user terminal is arranged to periodically generate a message at predetermined intervals and transmit the periodic message to the at least one network node via the access node over the communication network, receive responses to the periodic messages from the at least one network node, analyse the responses to determine whether to terminate the connection to the access node, and, in the case that the connection to the access node should be terminated, transmit a disconnect message to the access node from the user terminal.

Preferably, the user terminal is arranged to analyse the responses by determining that at least one of the responses comprises a command to terminate the connection from the at least one network node.

The user terminal may be arranged to analyse the responses by determining that at least one of the responses has not been received at the user terminal within a predefined time interval.

The periodic message may comprise a sequence number, and the sequence number may be incremented for each periodic message generated.

The user terminal may be arranged to transmit the periodic message to the at least one network node by alternately transmitting the periodic message to a first network node and a second network node.

The at least one network node may be arranged to store each periodic message in a database.

The connection to the access node may be terminated responsive to the at least one network node determining that a user of the user terminal has less than a predetermined quantity of credit.

The user terminal may be arranged to execute a communication client. The communication client may be a voice over internet protocol client.

BRIEF DESCRIPTION OF THE DRAWINGS

For a better understanding of the present invention and to show how the same may be put into effect, reference will now be made, by way of example, to the following drawings in which.

DETAILED DESCRIPTION

Figure 1:
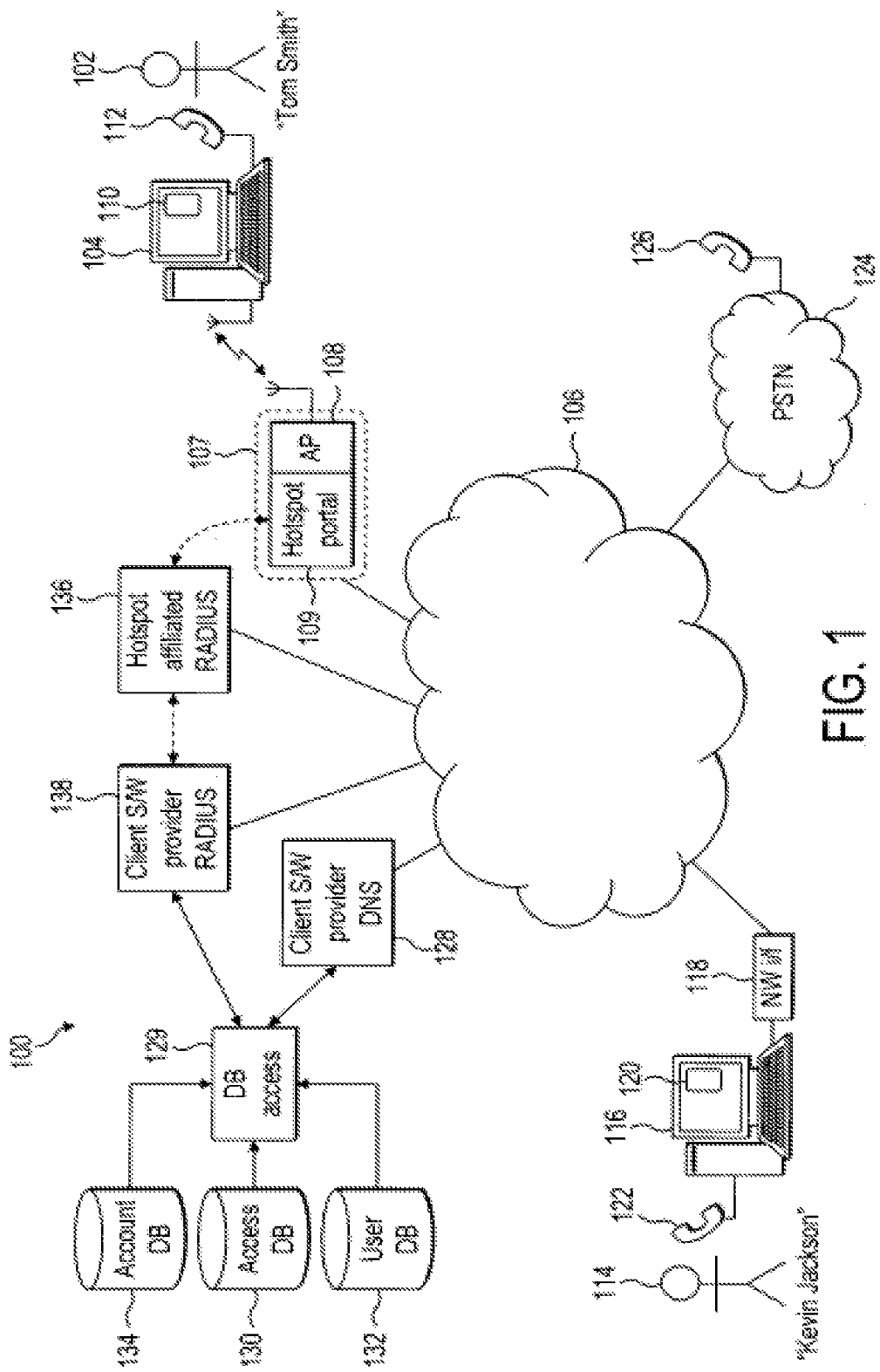
FIG. 1 shows a packet-based communication system.

Reference is first made to FIG. 1, which illustrates a packet-based communication system 100. It should be appreciated however, that whilst this system and method is described with reference to a packet-based communication system, the same techniques could also be applied to provide access to hotspots for other applications. Note also that whilst this illustrative embodiment is described with reference to a P2P communication system, other types of communication system could also be used, such as non-P2P, VoIP or IM systems. A first user of the communication system (named "Tom Smith" 102) operates a user terminal 104 which is able to connect to a network 106 such as the Internet. The user terminal 104 may be, for example, a personal computer ("PC") (including, for example, Windows™, Mac OS™ and Linux™ PCs), a personal digital assistant ("PDA"), a mobile phone, a gaming device or other embedded device able to connect to the network 106. The user terminal 104 is arranged to receive information from and output information to the user 102 of the device. In a preferred embodiment of the invention the user device comprises a display such as a screen and an input device such as a keyboard, mouse, joystick and/or touch-screen.

In the example shown in FIG. 1, the user terminal 104 comprises a network interface that is able to connect to a WLAN access node 107. The access node comprises an access point ("AP") 108, which provides wireless connections to the access node 107, and a hotspot portal 109, which controls whether a user terminal is able to connect to the access node 107. The AP 108 and hotspot portal 109 can be co-located in a single entity, or be provided in distinct separate entities. However, regardless of the structural layout, the functionality of the two elements is the same, such that the hotspot portal 109 controls whether a user terminal is able to connect to the network 106 (and hence the internet) via the AP 108. The hotspot portal 109 provides functionality such as redirection for authentication and payment.

The user terminal 104 is running a communication client 110, provided by the software provider. The communication client 110 is a software program executed on a local processor in the user terminal 104. The user terminal 104 is also connected to a handset 112, which comprises a speaker and microphone to enable the user to listen and speak in a voice call. The microphone and speaker does not necessarily have to be in the form of a traditional telephone handset, but can be in the form of a headphone or earphone with an integrated microphone, as a separate loudspeaker and microphone independently connected to the user terminal 104, or integrated into the user terminal 104 itself.

Figure 2:
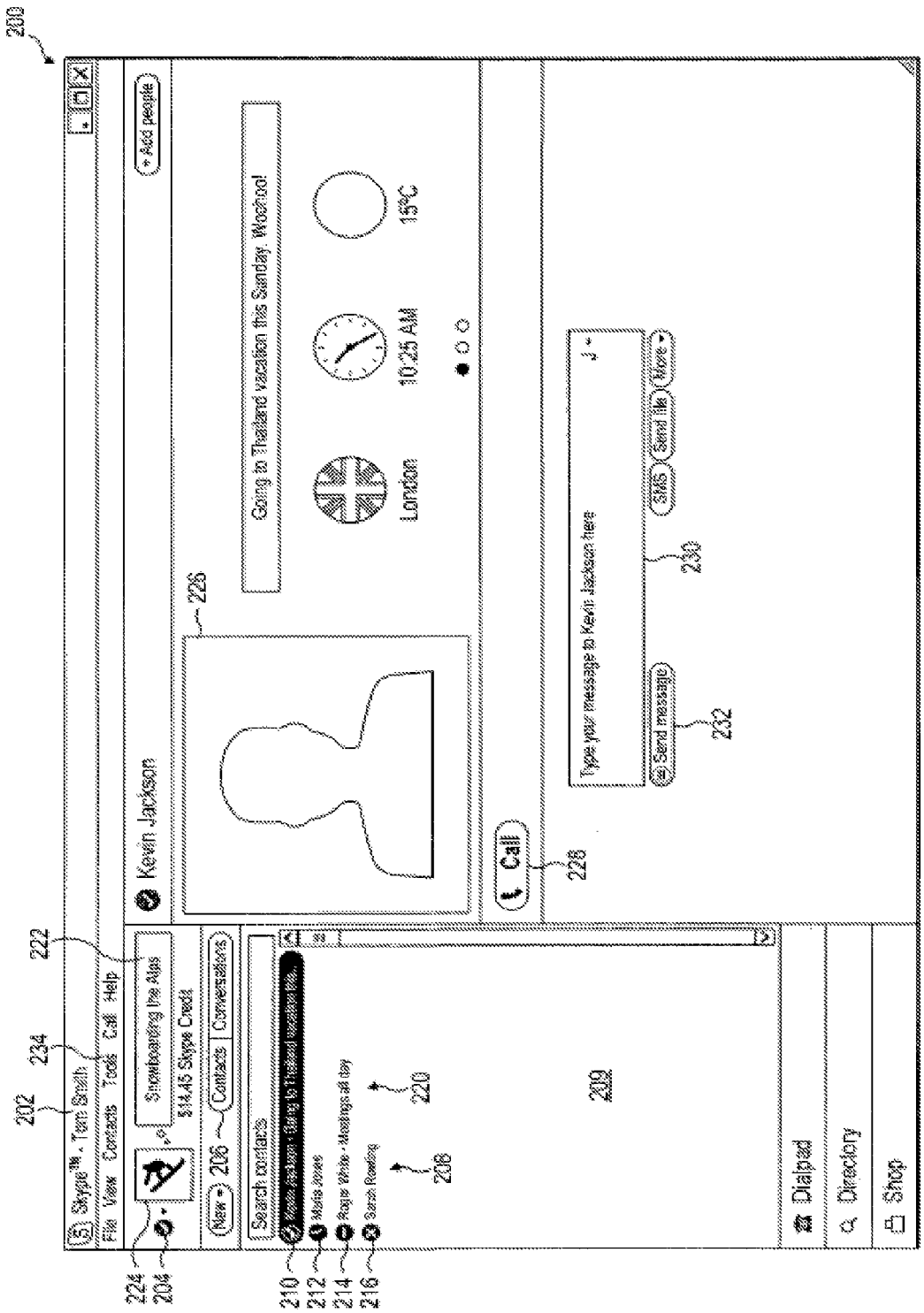
FIG. 2 shows a user interface of a communication client.

An example of a user interface 200 of the communication client 110 executed on the user terminal 104 of the first user 102 is shown illustrated in FIG. 2. Note that the user interface 200 can be different depending on the type of user terminal 104. For example, the user interface can be smaller or display information differently on a mobile device, due to the small screen size. In the example of FIG. 2, the client user interface 200 displays the username 202 of "Tom Smith" 102 in the communication system, and the user can set his own presence state (that will be seen by other users) using a drop down list by selecting icon 204.

The client user interface 200 comprises a button 206 labelled "contacts", and when this button is selected the contacts stored by the user in a contact list are displayed in a pane 209 below the button 206. In the example user interface in FIG. 2, four contacts of other users of the communication system are shown listed in contact list 208. Each of these contacts have authorised the user 102 of the client 110 to view their contact details and presence state. Each contact in the contact list has a presence status icon associated with it. For example, the presence status icon for "Kevin Jackson" 210 indicates that this contact is "online", the presence icon for "Maria Jones" 212 indicates that this contact is "away", the presence icon for "Roger White" 214 indicates that this contact's state is "do not disturb" ("DND"), the presence icon for "Sarah Rowling" 216 indicates that this contact is "offline". Further presence state indications can also be included. Mood messages 220 of the contacts are shown displayed next to the names of the contacts in pane 209.

Presuming that the user 102 is able to gain access to the network 106 via the WLAN access node 107, VoIP calls to the users in the contact list may be initiated over the communication system by selecting the contact and clicking on a "call" button 228 using a pointing device such as a mouse. Referring again to FIG. 1, the call set-up is performed using proprietary protocols, and the route over the network 106 between the calling user and called user is determined by the peer-to-peer system without the use of servers. For example, the first user "Tom Smith" 102 can call a second user "Kevin Jackson" 114.

Following authentication through the presentation of digital certificates (to prove that the users are genuine subscribers of the communication system—described in more detail in WO 2005/009019), the call can be made using VoIP. The client 110 performs the encoding and decoding of VoIP packets. VoIP packets from the user terminal 104 are transmitted into the network 106 via the access node 107, and routed to a computer terminal 116 of the called party 114, via a network interface 118. A client 120 (similar to the client 110) running on the user terminal 116 of the called user 114 decodes the VoIP packets to produce an audio signal that can be heard by the called user using the handset 122. Conversely, when the second user 114 talks into handset 122, the client 120 executed on user terminal 116 encodes the audio signals into VoIP packets and transmits them across the network 106 to the user terminal 104. The client 110 executed on user terminal 104 decodes the VoIP packets, and produces an audio signal that can be heard by the user of the handset 112.

The VoIP packets for calls between users (such as 102 and 114) as described above are passed across the network 106 only, and the public switched telephone network ("PSTN") 124 is not involved. Furthermore, due to the P2P nature of the system, the actual voice calls between users of the communication system can be made with no central servers being used. This has the advantages that the network scales easily and maintains a high voice quality, and the call can be made free to the users. Additionally, calls can also be made from the client (110, 122) using the packet-based communication system to fixed-line or mobile telephones 126, by routing the call to the PSTN network 124. Similarly, calls from fixed-line or mobile telephones 126 can be made to the packet-based communication system via the PSTN 124.

In addition to making voice calls, the user of the client 110 can also communicate with the users listed in the contact list 208 in several other ways. For example, an instant message (also known as a chat message) can be sent by typing a message in box 230 (as shown in FIG. 2) and sending it by selecting the "send message" button 232. Additionally, the first user 102 can use the client 110 to transmit files to users in the contact list 208, send voicemails to the contacts or establish video calls with the contacts (not illustrated in FIG. 2).

Figure 3:
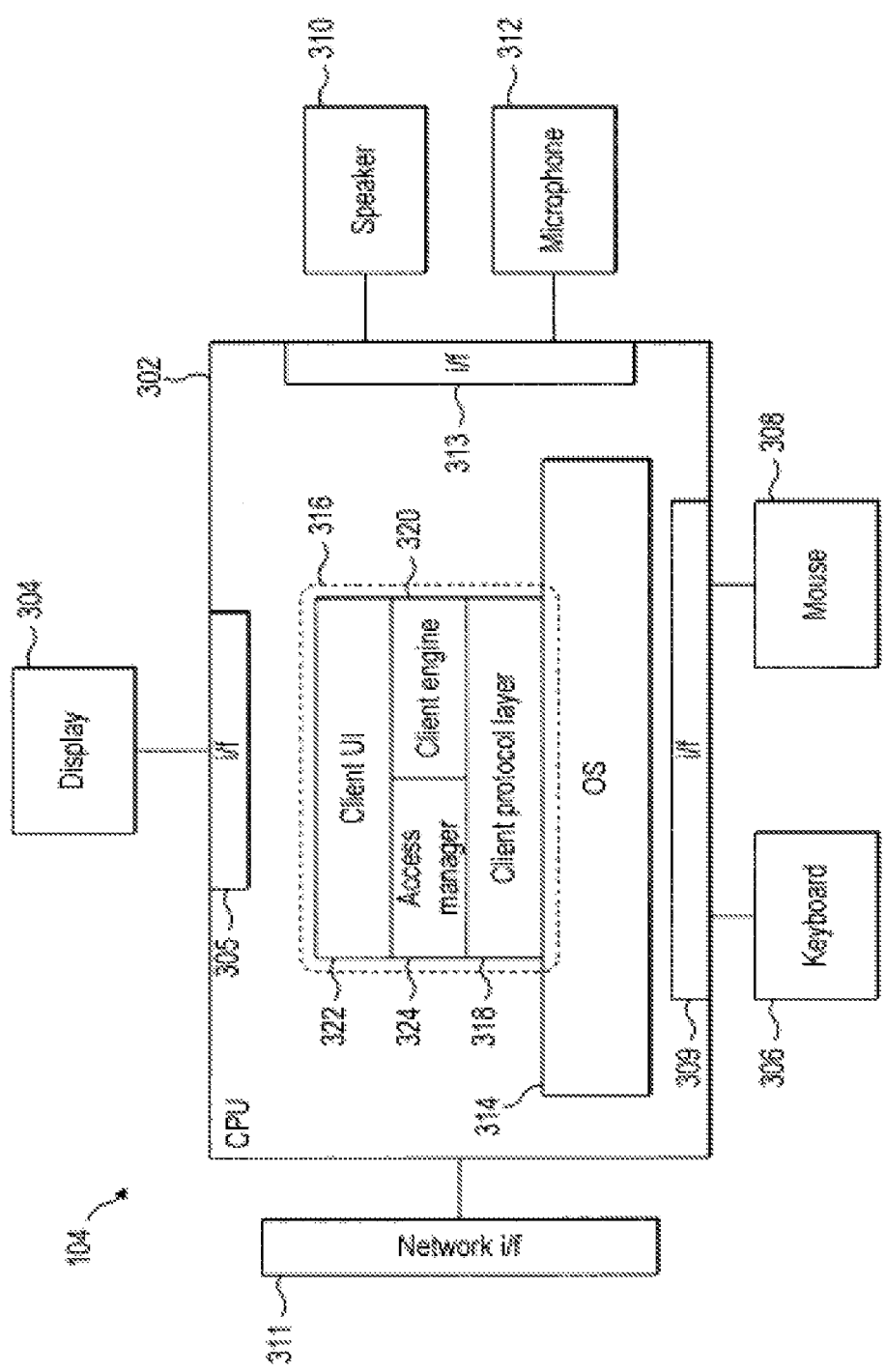
FIG. 3 shows a user terminal executing a communication client.

FIG. 3 illustrates a detailed view of the user terminal 104 on which is executed client 110. The user terminal 104 comprises a central processing unit ("CPU") 302, to which is connected a display 304 such as a screen via a display interface 305, an input device such as a keyboard 306 and a pointing device such as a mouse 308 connected via an interface 309 such as USB. In alternative terminals, the input devices and pointing device can be integrated into the terminal, such as a keypad, touch-screen and/or joystick. An output audio device 310 (e.g. a speaker) and an input audio device 312 (e.g. a microphone) are connected via an audio interface 313. The output audio device 310 and input audio device 312 may be integrated into a handset 112 or headset, or may be separate. The CPU 302 is connected to a network interface 311 for connecting to a WLAN AP.

FIG. 3 also illustrates an operating system ("OS") 314 executed on the CPU 302. Running on top of the OS 314 is a software stack 316 for the client 110. The software stack shows a protocol layer 318, a client engine layer 320 and a client user interface layer ("UI") 322. Each layer is responsible for specific functions. Because each layer usually communicates with two other layers, they are regarded as being arranged in a stack as shown in FIG. 3. The operating system 314 manages the hardware resources of the computer and handles data being transmitted to and from the network via the network interface 108. The client protocol layer 318 of the client software communicates with the operating system 314 and manages the connections over the communication system. Processes requiring higher level processing are passed to the client engine layer 320. The client engine 320 also communicates with the client user interface layer 322. The client engine 320 may be arranged to control the client user interface layer 322 to present information to the user via the user interface of the client (as shown in FIG. 2) and to receive information from the user via the user interface.

Also shown integrated into the client 110 is an access manager 324. The access manager 324 is responsible for managing access to WLAN hotspots, as will be described in more detail hereinafter. In preferred embodiments, the access manager 324 is integrated into the client 110, and utilises the client UI layer 322 to display information to the users, and the client protocol layer 318 to connect to the communication system. In alternative embodiments, the access manager 324 can be implemented as standalone software executed on the OS 314, but which is in communication with the client 110.

As stated above, a problem exists if the access node 107 provides only restricted access to the network 106, and the user does not possess the required credentials to enable access. Without access to the network 106, the user 102 is unable to use the communication client 110 to make calls (or send IM messages) over the network 106 (for example to user 114, as described above).

The system and method described below enables the user to gain access to the hotspot 109 without supplying sensitive personal information to the hotspot operator, whilst using payment credits purchased from the communication client software provider.

Figure 4A:
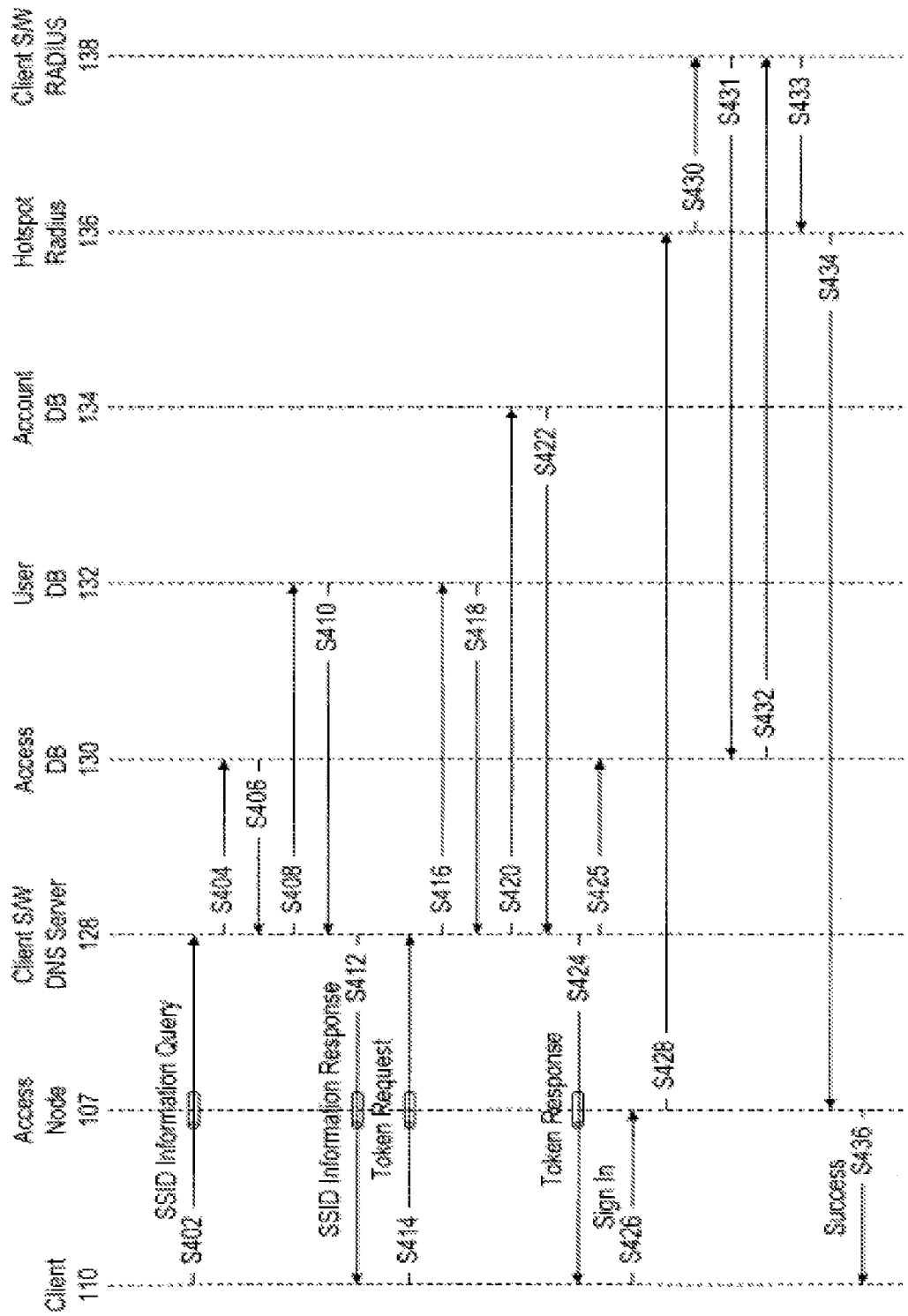
FIG. 4A shows a signalling chart for the process of logging into a WLAN hotspot.

Reference is now made to FIG. 1 and FIG. 4A, which describes the process for connecting to the restricted access node 107. As a first step (not shown in FIG. 4A), the operating system 314 of the device on which the client is installed scans for available wireless networks. The operating system can automatically connect to a remembered access point or prompt the user to select an access point. The operation of the scanning performed by the OS 314 depends on the user terminal 104 in use, and the OS that it is running.

The access manager 324 (in FIG. 3) detects changes occurring at the network interface 311. This can be achieved either by the access manager 324 being notified of a network interface event or by periodic polling by the access manager. The mechanism used for this depends on the user terminal 104 in question.

When a change in network interface is detected the access manager 324 reads the service set identifier ("SSID") of the AP 108 found by the OS 314 scan. Responsive to this, the access manager 324 generates an SSID information query. This query is used to discover whether it is possible for the access manager to log in to the hotspot 109 in question, and pay for access using pre-existing payment credits. To do this, the access manager 324 needs to send the SSID information query over the network 106 to a server holding a database of acceptable SSIDs. However, general access to the network 106 is restricted by the hotspot 109. In alternative embodiments, a database of acceptable SSIDs could be kept at the user terminal, but this is more difficult to manage.

To circumvent this restriction to access to the network 106, the SSID information query is encoded as a DNS query that is sent to a communication client software provider domain name server ("DNS") 128 (in FIG. 1) over the network 106 via a DNS portal of the AP 108. The DNS protocol is used to bypass access restrictions of the hotspot 109 using a technique known as DNS tunneling.

Note that the communication client software provider domain name server ("DNS") 128 is not necessarily an actual domain name server, but can be a specially configured server that is arranged to communication using the DNS protocol.

This is achieved by using a Canonical name ("CNAME") record DNS query. Both the query and response format must comply with strict rules. The total length of a fully qualified domain name ("FDQN") cannot exceed 255 bytes when represented in internal format that intermixes labels of up to 63 characters with length bytes. Using maximum length labels, there are 250 characters for carrying a payload. Base32 encoding can be used with the dictionary abcdefghjklm-nopqrstuvwxyz0123456. Each character can carry 5 bits of binary payload, which means that each response and query can carry 1248 bits. An 1152 bit Rivest Shamir Adleman ("RSA") key is used for encryption. The readable form of query would be in a similar form to "data.data.data.access.skype.com".

The SSID information query sent from access manager 324 to the communication client software provider DNS server 128, comprises the SSID identifying the wireless LAN AP 108, a media access control ("MAC") address (identifying the physical network interface of the AP 108) and optionally the username of the user 102 logged into the client 110.

More specifically, the payload of the SSID information query comprises the following data:
 command—1 byte, indicates that the payload is a SSID Information Request
 cmdid—1 byte, client-assigned command ID. The DNS server will then send it back in responses to allow matching commands and responses
 username—32 bytes, string, may be non-zero-terminated if username is exactly 32 bytes long
 access point SSID—32 bytes, string, may be non-zero-terminated if SSID is exactly 32 bytes long
 access point MAC—6 bytes, binary, all zeroes if not available
 random client challenge—16 bytes, binary
 username hash for usernames longer than 32 characters, binary—20 bytes (SHA1) (this is meaningful only if username is not terminated with zero)

The command portion of the payload is sent unencrypted. The remaining payload is RSA encrypted for security. The payload is then base32 encoded, the result is then broken down into separate labels, with a domain name for which the packet-based communication system provider runs a DNS service added, for example ".access.skype.com".

The access manager 324 in the client 110 then makes a recursive CNAME query. This is shown as step S402 in FIG. 4A. As stated, because this is a DNS query (using DNS tunneling), the message can be sent even though the hotspot 109 restricts access to the network 106.

On receipt of the SSID query the communication client software provider DNS server 128 extracts the binary payload by concatenating all labels and leaving out any characters that are not in the dictionary, until the result is 231 characters long, at which point the base32 encoding is removed, resulting in 144 byte binary payload. The binary payload is then RSA decrypted.

The communication client software provider DNS server 128 determines if an agreement exists between the hotspot 109 operator and a payment partner (i.e. a trusted partner with whom a billing arrangement exists). This is determined by querying an access database 130 with the SSID in step S404. A response is received from the access DB 130 in step S406. Pricing information for this hotspot 109 is also retrieved in step S406. The location of the user (set in the user's profile information) can optionally be determined by querying a user database 132 with the username in step S408 and receiving the response in step S410. Using this data, pricing information may be given in the user's local currency.

Note that the databases in FIG. 1 are accessed via an optional DB access node 129.

If the SSID information query does not include the MAC address then the DNS server 128 just looks up the SSID, ignoring the MAC. If the query specifies a certain MAC, then server attempts to find a match. If a match is not found, then server zeroes out MAC address in response, and responds with generic SSID information.

The communication client software provider DNS server 128 generates an SSID response, encoded as a DNS response. If it is determined that the user 102 can pay for access to the internet via the AP 108 using their credit (as purchased for use in the packet-based communication system), the SSID response will indicate that the client 110 can pay for accessing the hotspot using the access manager 324. In particular the SSID response can include pricing information for the hotspot 109 in the user's local currency.

The SSID information response payload generated by the communication client software provider DNS server comprises:
  cmdid—1 byte, command ID of SSID request command that this response corresponds to
  access point SSID—32 bytes, string, may be non-zero-terminated if SSID is exactly 32 bytes long
  access point MAC—6 bytes, binary, all zeroes if not available
  price—4 bytes, big endian unsigned integer
  price_precision—4 bytes, price decimal precision, big endian unsigned integer
  currency—4 bytes, zero terminated 3-letter currency code
  provider ID—2 bytes, big-endian integer The communication client software provider DNS server 128 encrypts the SSID information response using an encryption key derived from the 'client challenge' provided in the query. After encryption the payload is base32 encoded.

The SSID information response is sent to the client 110 in step S412 using DNS tunneling.

In response to receiving a positive response to the SSID information query, the access manager 324 is arranged to generate a token request and to transmit the token request using the DNS protocol (tunneling) to the communication client software provider DNS server 128 in step S414.

The payload of the token request message comprises:
  command—1 byte
  cmdid—1 byte, client-assigned command ID.
  username—32 bytes, string, may be non-zero-terminated if username is exactly 32 bytes long
  access point SSID—32 bytes, string, may be non-zero-terminated if SSID is exactly 32 bytes long
  password hash—16 bytes (MD5), binary
  random client challenge—16 bytes, binary
  username hash for usernames longer than 32 characters, binary—20 bytes (SHA1) (this is meaningful only if username is not terminated with zero)

The 1-byte command is sent unencrypted, the remaining total payload of 117 bytes is RSA encrypted. The password hash is a username/password hash where additionally first 16 bytes of public RSA key are hashed in. This makes the hash usable only while the RSA key that has been used to encrypt the packet, invalidating all previously sent hash values when the RSA key is invalidated.

The resulting 1160 bits are then base32 encoded, the result broken down into separate labels, and a domain name for which the packet-based communication system provider runs a DNS service added, for example ".access.skype.com". The client 110 then makes a recursive CNAME query in IN class to the communication client software provider DNS server 128 in step S414. As each query is different, each reaches the DNS server that gives authoritative answers for a specified domain.

The 'client challenge' is used for generating a key for encrypting the response packets, and also for generating a sessionID value from the token (described below). For example, the RC4-drop(768) symmetric encryption algorithm can be used, although any symmetric cipher in stream mode can also be used.

In response to receiving the token request the communication client software provider DNS server is arranged to decrypt the token request and to extract the username and password hash. In step S416 and S418, the DNS server verifies the username and password against credentials listed in the user database 132. In step S420, the user's credit balance is requested from an account DB 134, and a response received in S422, to ensure that the user has sufficient credit to pay for the hotspot 109 access.

If the user is verified and has sufficient credit, then the communication client software provider DNS server 128 will generate a random 16-byte token and respond to the client 110 with a base32-encoded response.

The payload of the token response message comprises:
  command—1 byte
  rc4 initialization vector—4 bytes, binary value
  result code—1 byte
  cmdid—1 byte, command ID of token request command that this response corresponds to
  token—8 bytes
  tick server addresses—8 bytes, preferably two IP addresses of where to send ticks to (described below)
  login name format specifier—up to 83 bytes.

The entire payload starting from result code is encrypted using a key generated from the client challenge. After encryption the payload is base32 encoded. The token response message is then sent to the client 110 in step S424 using DNS tunneling. The client 110 then decodes and then decrypts the response.

The communication client software provider DNS server 128 also stores the token that it generated with the username and the client challenge in the access DB 130 in step S425. The communication client software provider DNS server 128 also generates a temporary username from the token (as described below) and stores this as a session ID. The token, if unused, will expire from the server after a predetermined time.

Figure 5:
FIG. 5 shows a message displayed to a user before connecting to a WLAN hotspot.

In response to receiving the token and format specifier in step S424, the access manager 324 decodes and decrypts the response. The access manager 324 then controls the client UI 322 to provide the user with the option to pay for connection using their packet-based communication system credit. An example user interface message is shown illustrated in FIG. 5. The user 102 can choose to connect to the AP 108 by selecting the "start" button 502, or choose not to connect by selecting the "cancel" button.

In response to receiving a selection signal from the user indicating that the user wishes to connect to the AP 108, the access manager signs in to the hotspot 109 in step S426 using a temporary username (derived from the token and the client challenge) and a temporary password (derived from a hash function of the user's password and the client challenge).

The temporary username is formatted according to the format specifier included in the token response. The format of the temporary username allows the hotspot 109 provider to determine the identity of the billing partner.

The client 110 signs into the hotspot 109 in accordance with the WISPr recommendations. The access manager 324 attempts to send a http request via the AP 108, for retrieving a predetermined file of known content. The hotspot 109 redirects the request to the hotspot provider's login server (not shown). In response to being redirected to the login server, the access manager 324 is arranged to provide the temporary username and password to sign into the login server.

The hotspot 109 determines from the format of the temporary username (e.g. it has prefix indicating the billing partner) that the login request is associated with the packet-based communication system billing partner and forwards the billing request to the hotspot's Remote Authentication Dial In User Service ("RADIUS") server 136 in step S428.

In response to receiving the login request at the hotspot RADIUS server 136, the hotspot RADIUS server 136 determines from the format of the temporary user name that the login request is associated with the packet-based communication network. The hotspot RADIUS server 136 sends an authorisation query comprising the temporary username and password to the communication client software provider RADIUS server 138 in step S430.

The communication client software provider RADIUS server 138 receives the temporary username and password. Once the communication client software provider RADIUS server 138 has verified the credentials stored in the access DB 130 in steps S431 and S432, it responds to the hotspot RADIUS server 136 in step S433 with an "access accept" or "access reject" message. The "access accept" message identifies the session using the temporary username and can define the length of allowed session time calculated from the minimum of 30 min or the credit divided by the cost per minute.

Assuming an "access accept" message was received, the hotspot RADIUS server 136 transmits an authorisation message to the hotspot 109 in step S434. In response to receiving the authorisation message, the hotspot 109 allows the client 110 to access the internet, and informs client 110 that login was successful in step S436.

Figure 6:
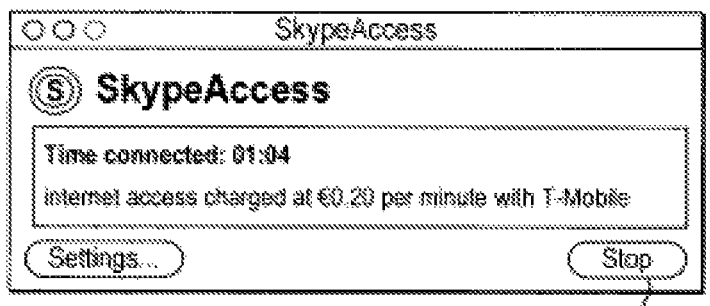
FIG. 6 shows a message displayed to a user during connection to a WLAN hotspot.

The access manager 324 informs (other elements of) the client 110 that login was successful. During the connection with the AP 108, the access manager 324 controls the client 322 UI to inform the user that the terminal is connected to the network as shown in FIG. 6. The user 102 can select to terminate the connection by selecting the "stop" button 602, as described hereinafter.

Figure 4B:
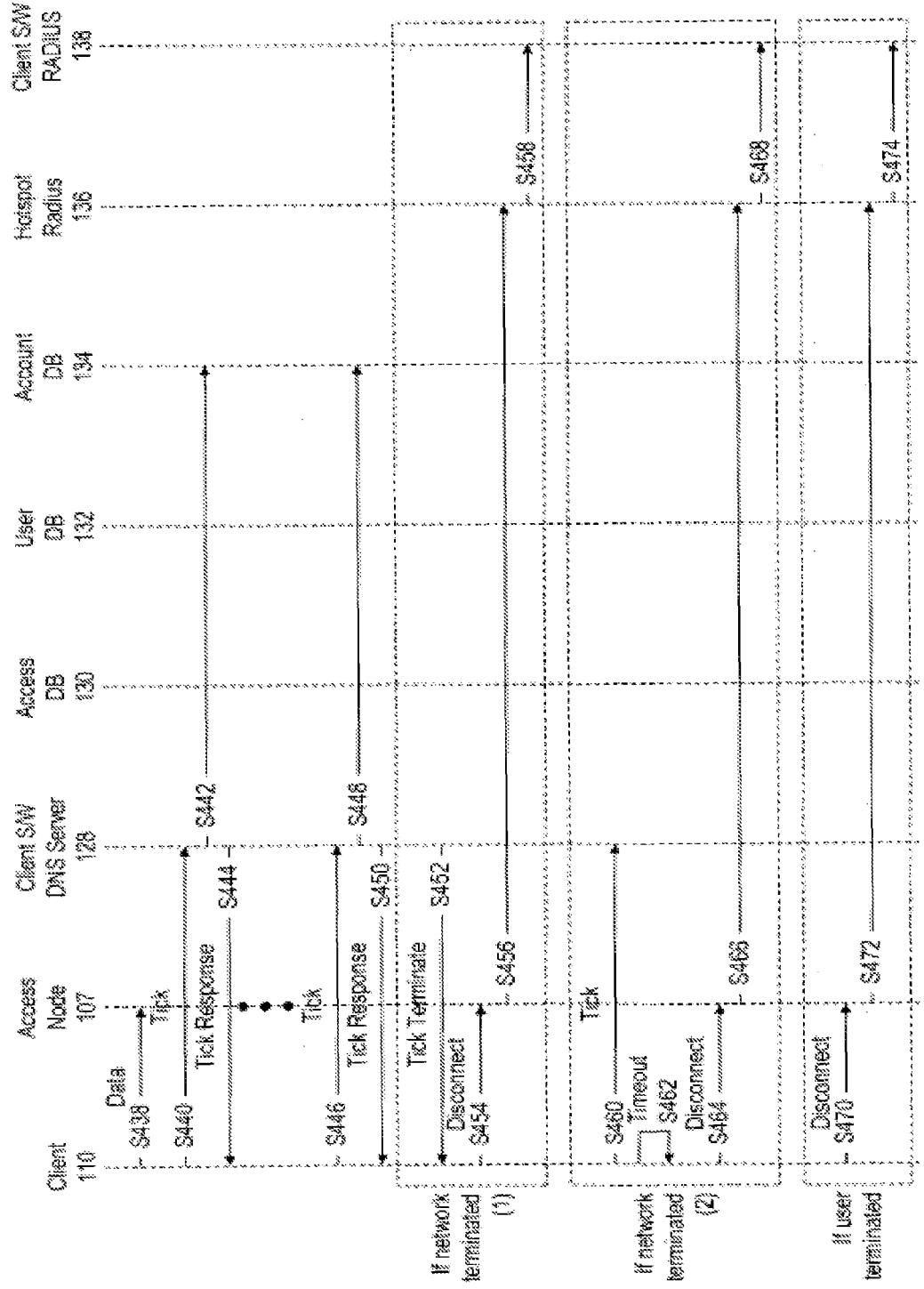
FIG. 4B shows a signalling chart for the process of sending data and terminating a connection to a WLAN hotspot.

Reference is now made to FIG. 4B, which illustrates the process during an ongoing connection to the AP 108, and when the connection is terminated.

In step S438, data is transmitted by the client 110 over the network 106 via the AP 108. This data can be in the form of a VoIP call or IM message to user 114, for example.

However, as mentioned above, the hotspot 109 that controls access to the internet is not controlled by the packet-based communication software provider. Therefore, it is problematic for the packet-based communication software provider to terminate the hotspot 109 session from the network side. This problem is solved by transmitting periodic messages or "ticks" from the client 110 and sending responses from the communication client software provider DNS server 128 to the client 110. The client 110 is configured to terminate the hotspot 109 session when indicated by the tick responses from the communication client software provider DNS server 128.

During the connection to the AP 108 the access manager 324 generates tick messages at predetermined time intervals (e.g. every 30 seconds). These ticks are sent to the communication client software provider DNS server 128 identified in the token response (see payload description above) in step S440. The information derived from the ticks for each session are stored in the account database 134 in step S442 so that they can be matched offline to the charges received from the billing partner.

In one embodiment of the invention access manager 324 may be arranged to send ticks alternately between two DNS servers identified in the token response to increase reliability.

The payload of the tick message comprises:
command indicating that the packet is a tick
temporary username
tick sequence number—4 bytes, big-endian unsigned integer
sequence_hash—16 bytes, MD5hash(client_challenge,sequence)

The ticks generated at the client 110 include a sequence number that is initialized to a nonzero random value and then increased every time a tick is sent. The communication client software provider DNS server 128 initializes a sequence number to 0. When a tick is received, the communication client software provider DNS server 128 calculates an MD5 hash on its own to verify that the seqence_hash matches the sequence number and the client challenge for the session. It then checks the sequence number against last successfully received sequence number. If the sequence number is smaller than the server-stored value (i.e. the tick arrived later than the tick that was sent after it) then the server does not update its counter. If the sequence number is bigger than one that server has stored then server does update its counter. The total number of ticks received for each session may be stored such that charges received from the billing partner may be reconciled.

In step S444, the communication client software provider DNS server 128 is arranged to generate a response to the tick received from the client 110. If the sequence number is smaller than server-stored value (i.e. the tick arrived later than tick that was sent after it) then the communication client software provider DNS server 128 responds to client with a RESULT_TICKIGNORED result code. If the sequence number is bigger than the one that the communication client software provider DNS server 128 has stored then the communication client software provider DNS server 128 responds with a RESULT_TICKACCEPTED code.

Further ticks, stores in the account DB 134, and tick responses are shown in S446, S448 and S450, respectively.

The periodic sending of ticks and receipt of responses continues during the length of the session with the AP 108.

The termination of the session with the AP 108 can occur due to either the network side or the client 110 terminating the connection. A network-side termination can occur in one of two ways, as described below.

A network-side termination can be required for the following reason. The communication client software provider DNS server 128 can determine that the user has less credit than determined at the beginning of the session (e.g. in S420). For example if the user of the client 110 has placed a charged VoIP call during the session (or depleted his credit in another way). In this case the communication client software provider DNS server 128 (or other server that generates the tick responses) can end the session in the following two ways.

In the first method, a RESULT_TERMINATE message is sent as a response to a tick from the communication client software provider DNS server 128 to the access manager 324 in step S452. In response to receiving the RESULT_TERMINATE message the access manager 324 is arranged to logout from the hotspot 109 and disconnect from the AP 108 in step S454. The hotspot 109 then generates an accounting stop message and closes access to the internet. The accounting stop message is sent to the hotspot RADIUS server 136 in S456. The charges accrued for the session are then sent to the communication client software provider RADIUS server 138 in S458 for payment offline.

In the second method, the communication client software provider DNS server(s) 128 are arranged to stop sending tick responses to the client 110 when the connection is to be terminated. In this case the client 110 sends a tick message in S460, and waits for a response. If a response is not received after a predetermined time interval in S462, then the client 110 is arranged to logout from the hotspot 109 and disconnect from the AP 108 in step S464. The hotspot 109 then generates an accounting stop message and closes access to the internet. The accounting stop message is sent to the hotspot RADIUS server 136 in S466. The charges accrued for the session are then sent to the communication client software provider RADIUS server 138 in S468 for payment offline.

The termination of the session by the client is now described with reference to steps S470 to S474.

As mentioned, the user 102 can terminate the session by selecting the "stop" button 602 in FIG. 6. Other methods for terminating the session are also possible, such as using OS controls. When the user 102 terminates the session the access manager 324 is arranged to generate a disconnect instruction. The disconnect instruction is sent to the hotspot 109 in S470. On receipt of the disconnect instruction the hotspot 109 terminates the access to the internet. The hotspot 109 sends an accounting stop message in S472 to the hotspot RADIUS server 136. The hotspot RADIUS server 136 determines the cost of the session. The charges accrued for the session are then sent to the communication client software provider RADIUS server 138 in S468 for payment offline.

Figure 7:
FIG. 7 shows a message displayed to a user upon disconnection from a WLAN hotspot.

Upon termination of the session with the AP 108 (by whatever method), the client 110 is arranged to control the UI to display a session end message, as shown in FIG. 7. The user can close the message by selecting the "close" button 702, or reconnect to the AP 108 using the "start" button 704.

Advantageously, the ticks received at the communication client software provider DNS server 128 from the client 110 are used to reconcile payment with hotspot operator, as an independent record of the length of time that a user was connected to the AP 108 can be generated.

In preferred embodiments, the password and username of the user currently logged into the client 110 are stored locally, to automatically allow the start of a new session when the current one ends because the maximum session duration has been exceeded.

While this invention has been particularly shown and described with reference to preferred embodiments, it will be understood to those skilled in the art that various changes in form and detail may be made without departing from the scope of the invention as defined by the appendant claims. For example, in a preferred embodiment of the invention the access manager is an embedded module of the communication client. In an alternative embodiment the access client is a stand alone program that polls the communication client for account credentials. Furthermore, the above-described technique does not have to be used for providing network access for a packet-based communication client. The technique can be applied for any application that requires access to the internet.

What is claimed is:

1. A computer-implemented method comprising:
   receiving, at a network node and from a client device via an access node with access restrictions, a request message over a communication network via tunneling, the request message associated with the client device requesting to obtain general access to the communication network via the network node, the receiving comprising receiving the request message prior to the client device receiving the general access to the communication network, the request message encoded to enable the client device to tunnel the request message through the access node to circumvent the access restrictions associated with the access node;
   enabling, using the network node, the client device to establish a data connection with the access node, the data connection with the access node configured to enable general access to the communication network;
   periodically receiving, at the network node and from the client device via the access node, a message at predetermined intervals over the communication network; and
   sending, to the client device and from the network node via the access node, responses to the periodic messages, wherein the responses to the periodic messages are configured to enable the client device to determine whether to terminate the data connection to the access node.

2. The computer-implemented method of claim 1, wherein enabling the client to establish a data connection with the access node further comprises:
   querying, using the network node, an access database for verification information associated with the client device obtaining general access to the communication network;
   receiving, using the network node, a reply message from the access database indicating whether the client device is verified to obtain general access to the communication network; and
   sending, to the client device using tunneling from the network node via the access node, a response message indicating whether the client device is verified to obtain general access to the communication network.

3. The computer-implemented method of claim 2, wherein the verification information comprises payment information associated with obtaining general access to the communication network.

4. The computer-implemented method of claim 2, wherein the response to the client device comprises pricing information.

5. The computer-implemented method of claim 2, wherein:
the request message from the client device comprises a random client challenge value; and
the response message to the client device is at least partially encrypted based, at least in part, on the random client challenge value.

6. The computer-implemented method of claim 2 further comprising:
receiving, at the network node and from the client device via the access node using tunneling, a token request comprising user credentials associated with the client device; and
responsive to verifying the user credentials, sending, from the network node and to the client device via the access node using tunneling, a token response comprising a token associated with gaining general access to the communication network.

7. The computer-implemented method of claim 6, wherein:
the token request further comprises a random client challenge value; and
the token response is at least partially encrypted based, at least in part, on the random client challenge value.

8. The computer-implemented method of claim 6 further comprising:
generating the token based, at least in part, on:
the received user credentials; and
the random client challenge value.

9. One or more computer-readable storage memories comprising processor-executable instructions which, responsive to execution by at least one processor, are configured to enable a network node device to:
receive, at the network node and from a client device via an access node with access restrictions, a request message over a communication network via tunneling, the request message associated with the client device requesting to obtain general access to the communication network via the network node, the request message received prior to the client device receiving the general access to the communication network, the request message encoded to enable the client device to tunnel the request message through the access node to circumvent the access restrictions associated with the access node;
enable, using the network node, the client device to establish a data connection with the access node, the data connection with the access node configured to enable general access to the communication network;
periodically receive, at the network node and from the client device via the access node, a message at predetermined intervals over the communication network; and
send, to the client device and from the network node via the access node, responses to the periodic messages, wherein the responses to the periodic messages are configured to enable the client device to determine whether to terminate the data connection to the access node.

10. The one or more computer-readable storage memories of claim 9, wherein the processor-executable instructions to enable the client to establish a data connection with the access node are further configured to:
query, using the network node, an access database for verification information associated with the client device obtaining general access to the communication network;
receive, using the network node, a reply message from the access database indicating whether the client device is verified to obtain general access to the communication network; and
send, to the client device using tunneling from the network node via the access node, a response message indicating whether the client device is verified to obtain general access to the communication network.

11. The one or more computer-readable storage memories of claim 10, wherein the verification information comprises payment information associated with obtaining general access to the communication network.

12. The one or more computer-readable storage memories of claim 10, wherein the response to the client device comprises pricing information.

13. The one or more computer-readable storage memories of claim 10, wherein:
the request message from the client device comprises a random client challenge value; and
the response message to the client device is at least partially encrypted based, at least in part, on the random client challenge value.

14. The one or more computer-readable storage memories of claim 10, wherein the processor-executable instructions are further configured to enable the device to:
receive, at the network node and from the client device via the access node using tunneling, a token request comprising user credentials associated with the client device; and
responsive to verifying the user credentials, send, from the network node and to the client device via the access node using tunneling, a token response comprising a token associated with gaining general access to the communication network.

15. The one or more computer-readable storage memories of claim 14, wherein:
the token request further comprises a random client challenge value; and
the token response is at least partially encrypted based, at least in part, on the random client challenge value.

16. The one or more computer-readable storage memories of claim 14, wherein the processor-executable instructions are further configured to enable the device to:
generate the token based, at least in part, on:
the received user credentials; and
the random client challenge value.

17. The one or more computer-readable storage memories of claim 16, wherein the generated token is configured as a time-sensitive token.

18. The one or more computer-readable storage memories of claim 16, wherein the processor-executable instructions are further configured to enable the device to store the generated token in the access database.

19. A network node device comprising:
at least one processor; and
one or more computer-readable storage memories comprising processor-executable instructions which, responsive to execution by the at least one processor, are configured to enable the network node device to:
receive, via an access node and from a client device attempting to gain general access to a communications network, a request message over the communication network via tunneling, the request message configured to enable the client device to obtain a packet based communication service via the network node device, the request message encoded to enable the client device to tunnel the request through the access node to circumvent the access restrictions associated with the access node;

enable the client device to establish a data connection with the access node, the data connection with the access node configured to enable general access to the communication network;

periodically receive, from the client device via the access node, a message at predetermined intervals over the communication network; and send, to the client device via the access node, responses to the periodic messages, wherein the responses to the periodic messages are configured to enable the client device to determine whether to terminate the data connection to the access node.

20. The network node device of claim 19, wherein the processor-executable instructions to enable the client to establish a data connection with the access node are further configured to:

query an access database for verification information associated with the client device obtaining general access to the communication network;

receive a reply message from the access database indicating whether the client device is verified to obtain general access to the communication network; and send, via the access node and to the client device using tunneling, a response message indicating whether the client device is verified to obtain general access to the communication network.

* * * * *